United States Patent Office 3,128,226
Patented Apr. 7, 1964

3,128,226
COMPOSITION FOR RELIEVING PAIN
Saul Howard Rubin, Nutley, and John James Vance, Park Ridge, N.J., assignors to Hoffmann-La Roche Inc., Nutley, N.J., a corporation of New Jersey
No Drawing. Filed Aug. 22, 1962, Ser. No. 218,528
6 Claims. (Cl. 167—55)

This invention relates, in general, to novel therapeutic compositions. More particularly, it relates to compositions having outstanding analgesic activity.

1-(4-chlorophenethyl)-2-methyl-6,7-dimethoxy-1,2,3,4-tetrahydroisoquinoline, and its medicinally acceptable acid addition salts, are known compounds. It has been found that preparations having extremely valuable analgesic activity can be obtained by embodying, in tablet form, 1-(4-chlorophenethyl)-2-methyl-6,7-dimethoxy-1,2,3,4- tetrahydroisoquinoline, or one of its medicinally acceptable acid addition salts, in admixture with acetylsalicylic acid, p-ethoxyacetanilide and caffeine. Such preparations provide relief from pain which is superior to that provided either by the administration of any one component of the combination or by the administration of a mixture containing any two or three components of the combination.

Thus, in its most comprehensive embodiment, this invention is concerned with therapeutic compositions comprising 1-(4-chlorophenethyl)-2-methyl-6,7-dimethoxy-1,2,3,4-tetrahydroisoquinoline, or one of its medicinally acceptable acid addition salts, in admixture with acetylsalicylic acid, p-ethoxyacetanilide and caffeine.

In a more restrictvie embodiment, the invention is concerned with oral dosage forms of these compositions.

In another embodiment, the invention is concerned with the preparation or oral dosage forms of the presently claimed analgesic compositions.

In carrying out this invention, one may use 1-(4-chlorophenethyl)-2-methyl-6,7-dimethoxy1,2,3,4 - tetrahydorisoquinoline or a medicinally acceptable acid addition salt thereof. For convenience, the expression "medicinally acceptable acid addition salt" will be used throughout the present application to denote salts formed by reacting 1-(4-chlorophenethyl)-2-methyl-6,7-dimethoxy-1,2,3,4-tetrahydroisoquinoline with a medicinally acceptable acid. Salts of 1-(4-chlorophenethyl)-2-methyl-6,7-dimethoxy-1,2,3,4-tetrahydroisoquinoline which are fully suited for use include those formed by reacting that base with a medicinally acceptable inorganic acid, such as hydrochloric acid, hydrobromic acid, phosphoric acid, sulphuric acid, etc., as well as those formed by reacting the base with a medicinally acceptable organic acid, such as maleic acid, ascorbic acid, tartaric acid, etc. In producing the preferred products of the invention, however, either the 1,2,3,4-tetrahydroisoquinoline base itself, or a hydrohalide salt thereof, such as the hydrochloride, hydrobromide, etc. salt, is employed.

Varying quantities of the aforementioned therapeutically active ingredients can be used in preparing the compositions of this invention. However, the preparations, in unit dosage form, should contain from about 30 mg. to about 60 mg. of 1-(4-chlorophenethyl)2-methyl-6,7-dimethoxy-1,2,3,4-tetrahydroisoquinoline, or of one of its medicinally acceptable acid addition salts. Moreover, for each part by weight of the tetrahydroisoquinoline base, or acid addition salt thereof, present therein, each unit dose should contain from about 3.0 to about 10.0 parts by weight of acetylsalicylic acid; from about 2.0 to about 6.0 parts by weight of p-ethoxyacetanilide; and from about 0.25 part to about 1.5 parts by weight of caffeine. The preferred compositions of the invention, however, contain either 30 mg. or 60 mg. of 1-(4-chlorophenethyl)2-methyl-6,7-dimethoxy-1,2,3,4-tetrahydroisoquinoline or an acid addition salt thereof. A tablet containing, for example, 30 mg. of the tetrahydroisoquinoline base, or acid addition salt, will preferably contain also, for each part by weight of such base, or for each part by weight of such salt, from about 6.0 parts to about 10.0 parts by weight of acetylsalicylic acid; from about 4.0 parts to about 6.0 parts by weight of p-ethoxyacetanilide; and from about 0.75 part to about 1.25 parts by weight of caffeine. Stated differently, a tablet containing, for example, 30 mg. of the 1-(4-chlorophenethyl)-2-methyl-6,7-dimethoxy-1,2,3,4-tetrahydroisoquinoline, or of an acid addition salt thereof, will contain, preferably, from about 180 to about 300 mg. of acetylsalicylic acid, from about 120 to about 180 mg. of p-ethoxyacetanilide, and from about 22.5 mg. to about 37.5 mg. of caffeine. A tablet containing 60 mg. of 1-4-chlorophenethyl)-2-methyl-6,7-dimethoxy-1,2,3,4- tetrahydroisoquinoline, or of a medicinally acceptable acid addition salt thereof, will preferably contain also, for each part by weight of the tetrahydroisoquinoline base or for each part by weight of the salt thereof, present therein, from about 3.0 parts to about 5.0 parts by weight of acetylsalicylic acid, from about 2.0 parts to about 3.0 parts by weight of p-ethoxyacetanilide, and from about 0.3 to about 0.6 part by weight of caffeine. In other words, a tablet containing, for example, 60 mg. of 1-(4-chlorophenethyl)-2-methyl-6,7-dimethoxy-1,2,3,4- tetrahydroisoquinoline, or of a medicinally acceptable acid addition salt thereof, will contain preferably from about 180 mg. to 300 mg. of acetylsalicylic acid; from about 120 mg. to about 180 mg. of p-ethoxyacetanilide; and from about 18 mg. to about 36 mg. of caffeine.

The novel analgesic preparations of this invention can be formulated readily into pressed or coated tablets. Any of the various adjuvant materials, ordinarily found in conventional pharmaceutical tablets of the art, can be employed in preparing such tablets. These adjuvants include, for example, fillers such as cornstarch, lactose, dicalcium phosphate; disintegrating agents, such as maize starch; lubricants, such as talc, calcium stearate, etc. It should be fully understood, however, that other such adjuvant materials, the identity and use of which are well-known in the art, can also be used in carrying out this invention.

In general, tablets, suitable for oral administration, can be prepared by any conventional tableting procedure. For example, the preparations can be compressed, by usual methods, into single or multi-layer tablets. Moreover, the preparations can be produced in the form of coated tablets. The methods and techniques which will be most suitable for use in formulating the present compositions into such tablets will be readily apparent to those skilled in the art. A detailed description of the manner in which certain preferred tableting operations are carried out will, however, be found in the working examples which will follow hereinafter.

Typical oral dosages of the compositions of this invention will vary within rather wide limits. For example, in the case of a tablet containing 30 mg. of 1-(4-chlorophenethyl)-2-methyl-6,7-dimethoxy-1,2,3,4 - tetrahydroisoquinoline, or a tablet containing 30 mg. of a medicinally acceptable salt thereof, a typical oral dosage for an adult will be up to two tablets every four hours, as required. In the case of a tablet containing about 60 mg. of 1-(4-chlorophenethyl)-2-methyl-6,7-dimethoxy-1,2,3,4-tetrahydroisoquinoline, or of a medicinally acceptable salt thereof, a typical oral dosage for an adult will be up to one tablet every four hours, as required. In the case of children, age six to twelve years, or in the case of debilitated patients, smaller doses may, of course, be more appropriate. On the other hand, in the case of patients experiencing more severe discomfort due to pain, more frequent administration of the preparations may be prescribed. It should be fully understood, therefore, that the typical dosages mentioned herein are exemplary only and that they do not, to an extent, limit the scope or the practice of the present invention.

As indicated heretofore, the compositions of the present invention exhibit outstanding analgesic properties. As such, these preparations have found wide-spread application and use in the alleviation of pain. However, because of their superior analgesic activity, they are especially well suited for use in the treatment of headaches, particularly, the more severe type such as are caused, for example, by tension.

For a fuller understanding of the nature and objects of this invention, reference may be had to the following examples which are given merely as further illustrations of the invention and are not to be construed in a limiting sense.

Example 1

In this example, 16,250 grams of p-ethoxyacetanilide, 3,000 grams of caffeine and 2,300 grams of cornstarch, the latter being in the form of an aqueous paste, were blended for a period of about five minutes in a planetary-type mixer operating at low speed. Thereafter, 14,000 ml. of distilled water were added slowly to the mixture. Mixing was continued for a period of about twenty minutes. The wet mass was passed through a No. 4 mesh screen in a Stokes oscillating granulator. The mass was, thereafter, dried overnight at a temperature of about 42° C., following which it was passed through a No. 12 screen of a Fitzpatrick communting machine, model "D," operating at a medium speed.

The granular mass, which was obtained by the procedure described in the preceding paragraph, was then blended with 25,500 grams of a granulation containing 90% acetylsalicylic acid and 10% starch. Blended into the mixture also, was 200 grams of calcium stearate. Thereafter, the mass was compressed into kernels of 472.5 mg. weight, using a $^{15}\!/_{32}''$ deep concave punch.

The kernels, thus obtained, were subsequently sugar coated, with 1-(4-chlorophenethyl)-2-methyl-6,7-dimethoxy-1,2,3,4-tetrahydroisoquinoline being incorporated into the product during the coating procedure. The coating operation was carried out in the following manner. First, four coats of a 17% solution of shellac in a mixture of isopropyl alcohol (90%) and ethyl acetate (10%) were applied to the kernels. The shellac-coated kernels were, thereafter, permitted to dry overnight at room temperature. Subsequently, a gelatin solution was applied to the kernels, following which the coated kernels were dusted with a dicalcium phosphate dusting powder until a tablet weight of 520 mg. had been attained. The gelatin solution used in this step of the procedure was formulated as follows:

| | Parts by weight |
|---|---|
| Granular gelatin | 28.4 |
| Granular sugar | 454.6 |
| Distilled water | 23.7 |

The dicalcium phosphate dusting powder which was used had the following formulation:

| | Parts by weight |
|---|---|
| Dicalcium phosphate | 230 |
| Sugar | 150 |
| Cornstarch | 75 |
| Talc | 30 |
| Powdered gum acacia | 15 |

Thereafter, two coats of an aqueous sugar syrup (66⅔% solids) were applied to the tablets. The tablets were, thereafter, dried thoroughly with warm air at a temperature of about 50° C.

In six separate applications, a total of 6,600 grams of 1-(4-chlorophenethyl)-2-methyl-6,7-dimethoxy-1,2,3,4-tetrahydroisoquinoline wree applied to the tablets by dusting the tablets therewith, using gelatin solution as the adhesive. Thereafter, there was applied to the tablets two coats of the aforementioned gelatin solution. The tablets were then dusted with the forementioned dicalcium phosphate dusting powder. At this point in the procedure, each tablet had attained a weight of about 660 mg. The tablets were, thereafter, dried overnight at a temperature of about 42° C., following which they were smooth-coated to a weight of 730 mg., using a dicalcium phosphate grossing suspension having the following formulation:

| | |
|---|---|
| Sugar syrup (66⅔% solids) | liters__ 5 |
| Dicalcium phosphate | kilos__ 4 |
| Gelatin solution | liters__ 5 |

Thereafter, the coated tablets were colored by conventional procedures.

Example 2

In this example, coated tablets were produced using the same ingredients and, with but one exception, the same quantities thereof, as were used in Example 1. In producing the tablets of this example, 3,300 grams, rather than 6,600 grams employed in Example 1, of 1-(4-chlorophenethyl)-2-methyl - 6,7 - dimethoxy - 1,2,3,4 - tetrahydroisoquinoline were used.

The tablets were prepared by the procedure described in Example 1.

Example 3

In this example, triple-layer tablets were produced.

In formulating these tablets, there was blended together the following-named ingredients, in the quantities hereinafter indicated:

| | Mg./tablet |
|---|---|
| 1-(4-chlorophenethyl)-2-methyl-6,7-dimethoxy-1,2,3,4-tetrahydroisoquinoline | 61.8 |
| Spray dried lactose | 140.0 |
| Cornstarch | 40.0 |
| Calcium stearate | 1.2 |

This blend will be referred to hereinafter, for convenience, as "Layer No. 1." Thereafter, a granulation, hereinafter referred to as "Layer No. 2," was prepared using the following-named ingredients in the quantities indicated:

| | Mg./tablet |
|---|---|
| p-Ethoxyacetanilide | 162.5 |
| Caffeine | 30.0 |
| Cornstarch | 8.0 |
| FD & C Lake, Red No. 3 | 1.2 |
| Calcium stearate | 1.2 |

In producing Layer No. 2, the p-ethoxyacetanilide, caffeine and FD & C Lake, Red No. 3 were blended together and granulated with cornstarch, the latter being provided in the form of an aqueous paste.

Subsequently, another granulation hereinafter referred to as "Layer No. 3," was prepared by blending together the following named ingredients in the quantities indicated:

| | Mg./tablet |
|---|---|
| Granulation containing 90% of acetylsalicylic acid and 10% of starch | 255.0 |
| Calcium stearate | 2.0 |

The desired triple-layer tablets were prepared by compressing Layers No. 1, 2 and 3 on a Stokes triple layer compressing machine.

We claim:

1. A therapeutic composition comprising (1) a compound selected from the group consisting of 1-(4-chlorophenethyl) - 2 - methyl-6,7-dimethoxy-1,2,3,4-tetrahydroisoquinoline and an acid addition salt thereof with a medicinally acceptable acid (2) acetylsalicylic acid (3) p-ethoxyacetanilide and (4) caffeine, there being present in said composition for each part by weight of said 1,2,3,4-tetrahydroisoquinoline component from about 3.0 to about 10.0 parts by weight of said acetylsalicylic acid, from about 2.0 to about 6.0 parts by weight of said p-ethoxyacetanilide and from about 0.25 part to about 1.5 parts by weight of caffeine.

2. The composition of claim 1 which contains pharmaceutical adjuvant materials.

3. A therapeutic composition for oral administration in unit dosage form comprising a mixture of (1) a compound selected from the group consisting of 1-(4-chlorophenethyl)-2-methyl-6,7,-dimethoxy-1,2,3,4-tetrahydroisoquinoline and an acid addition salt thereof with a medicinally acceptable acid (2) acetylsalicylic acid (3) p-ethoxyacetanilide (4) caffeine and (5) pharmaceutical adjuvant materials, there being present in said composition for each part by weight of said 1,2,3,4-tetrahydroisoquinoline component from about 3.0 to about 10.0 parts by weight of said acetylsalicylic acid, from about 2.0 to about 6.0 parts by weight of said p-ethoxyacetanilide and from about 0.25 part to about 1.5 parts by weight of caffeine.

4. A therapeutic composition for oral administration in shaped unit dosage form comprising a mixture of (1) a compound selected from the group constisting of 1-(4-chlorophenethyl)-2-methyl-6,7,-dimethoxy-1,2,3,4-tetrahydroisoquinoline and an acid addition salt thereof with a medicinally acceptable acid (2) acetylsalicylic acid (3) p-ethoxyacetanilide (4) caffeine and (5) pharmaceutical adjuvant materials, there being present in said composition for each part by weight of said 1,2,3,4-tetrahydroisoquinoline component from about 3.0 to about 10.0 parts by weight of said acetylsalicylic acid, from about 2.0 to about 6.0 parts by weight of said p-ethoxyacetanilide and from about 0.25 part to about 1.5 parts by weight of caffeine.

5. A therapeutic compositon for oral administration in shaped unit dosage form comprising a mixture of (1) 30 mg. to 60 mg. of 1-(4-chlorophenethyl)-2-methyl-6,7-dimethoxy-1,2,3,4-tetrahydroisoquinoline (2) 180 mg. to 300 mg. of acetylsalicylic acid (3) 120 mg. to 180 mg. of p-ethoxyacetanilide (4) 18 mg. to 37.5 mg. of caffeine and (5) pharmaceutical adjuvant materials.

6. A therapeutic composition for oral administration in shaped unit dosage form comprising (1) 30 mg. to 60 mg. of an acid addition salt of 1-(4-chlorophenethyl)-2-methyl-6,7-dimethoxy-1,2,3,4-tetrahydroisoquinoline (2) 180 mg. to 300 mg. of acetylsalicylic acid (3) 120 mg. to 180 mg. of p-ethoxyacetanilide (4) 18 mg. to 37.5 mg. of caffeine and (5) pharmaceutical adjuvant materials.

References Cited in the file of this patent

Merck: 7th Index, pp. 8 and 12, 1960.
Brossi: Chem. Abst., vol. 55, 1961, pp. 8408–8409.
Wilson: American Drug Index, 1961, pp. 73–75.